United States Patent
Ozawa

(10) Patent No.: US 9,732,693 B2
(45) Date of Patent: Aug. 15, 2017

(54) METHOD FOR CONTROLLING INTERNAL COMBUSTION ENGINE, INTERNAL COMBUSTION ENGINE, AND VEHICLE EQUIPPED WITH SAME

(75) Inventor: Hisashi Ozawa, Hiratsuka (JP)

(73) Assignee: ISUZU MOTORS LIMITED, Tokyo (JP)

(*) Notice: Subject to any disclaimer, the term of this patent is extended or adjusted under 35 U.S.C. 154(b) by 246 days.

(21) Appl. No.: 14/123,012

(22) PCT Filed: May 10, 2012

(86) PCT No.: PCT/JP2012/062025
§ 371 (c)(1),
(2), (4) Date: Mar. 20, 2014

(87) PCT Pub. No.: WO2012/165118
PCT Pub. Date: Dec. 6, 2012

(65) Prior Publication Data
US 2014/0216413 A1    Aug. 7, 2014

(30) Foreign Application Priority Data
May 30, 2011   (JP) .................. 2011-120321

(51) Int. Cl.
*F02D 41/30* (2006.01)
*F02D 41/00* (2006.01)
(Continued)

(52) U.S. Cl.
CPC .......... *F02D 41/30* (2013.01); *F02D 41/008* (2013.01); *F02D 41/062* (2013.01); *F02D 41/40* (2013.01);
(Continued)

(58) Field of Classification Search
CPC .... F02D 41/008; F02D 41/0085; F02D 41/30; F02D 2200/101; F02D 2200/025;
(Continued)

(56) References Cited

U.S. PATENT DOCUMENTS 5,755,205 A * 5/1998 Nishimura .............. F02D 37/02
123/406.24
6,065,449 A * 5/2000 Fukuma .............. F02D 41/3827
123/357
(Continued)

FOREIGN PATENT DOCUMENTS

EP    0 924 421    6/1999
JP    63-255546    10/1988
(Continued)

OTHER PUBLICATIONS

Patent Abstracts of Japan, Publication No. 03-275958, Published Dec. 6, 1991.
(Continued)

*Primary Examiner* — Erick Solis
*Assistant Examiner* — Robert Werner
(74) *Attorney, Agent, or Firm* — Staas & Halsey LLP

(57) ABSTRACT

A method for controlling an internal combustion engine, an internal combustion engine, and a vehicle equipped with the same which reduce roll vibrations due to a power plant including a multi-cylinder internal combustion engine and a support apparatus during start of the internal combustion engine without impairing its startability. A control apparatus of a multi-cylinder internal combustion engine includes: a device for determining whether or not a rotational speed of the engine is within a resonance-rotational-speed region around a resonance rotational speed at which resonance occurs due to the rotational speed, a power plant including the engine, and rubber mounts of the power plant; and a
(Continued)

device for controlling injectors such that fuel injection amounts of respective cylinders become uneven when the rotational speed is within the resonance-rotational-speed region.

6 Claims, 9 Drawing Sheets

(51) Int. Cl.
    *F02D 41/06*      (2006.01)
    *F02D 41/40*      (2006.01)
    *F02D 41/38*      (2006.01)

(52) U.S. Cl.
    CPC .. *F02D 2041/389* (2013.01); *F02D 2200/101* (2013.01); *Y02T 10/44* (2013.01)

(58) Field of Classification Search
    CPC .... F02D 35/02; F02D 35/023; F02D 41/0082; F02D 41/0087; F02D 41/3006; G01M 15/08; G01M 15/12
    USPC .......... 123/435, 436; 73/35.07, 35.09, 35.12, 73/114.07, 114.16; 701/104, 111
    See application file for complete search history.

(56) References Cited

U.S. PATENT DOCUMENTS

| | | | | |
|---|---|---|---|---|
| 6,082,330 A | * | 7/2000 | Alberter | ............... F02D 35/023 123/436 |
| 6,668,812 B2 | * | 12/2003 | Javaherian | ........... F02D 41/0085 123/406.24 |
| 7,212,900 B2 | * | 5/2007 | Dominici | .............. F02D 41/008 701/101 |
| 2010/0116247 A1 | | 5/2010 | Shikama et al. | |

FOREIGN PATENT DOCUMENTS

| | | | | |
|---|---|---|---|---|
| JP | EP 0447697 A2 | * | 9/1991 | ........... F02D 35/023 |
| JP | 03-275958 | | 12/1991 | |
| JP | 10-159631 | | 6/1998 | |
| JP | 2001-355500 | | 12/2001 | |
| JP | 2008-184915 | | 8/2008 | |
| JP | 2008-286111 | | 11/2008 | |

OTHER PUBLICATIONS

Patent Abstracts of Japan, Publication No. 2001-355500, Published Dec. 26, 2001.
Patent Abstracts of Japan, Publication No. 2008-184915, Published Aug. 14, 2008.
Patent Abstracts of Japan, Publication No. 63-255546, Published Oct. 21, 1988.
International Search Report dated Jun. 12, 2012 in PCT/JP2012/062025.

* cited by examiner ically multiples of which are 180 degrees, intensify
METHOD FOR CONTROLLING INTERNAL COMBUSTION ENGINE, INTERNAL COMBUSTION ENGINE, AND VEHICLE EQUIPPED WITH SAME This application claims the benefit under 35 U.S.C. Section 371, of PCT International Application No. PCT/JP2012/062025, filed May 10, 2012, and under 35 U.S.C. §119 of Japanese Application No. 2011-120321 filed May 30, 2011, the contents of which are incorporated herein by reference.

TECHNICAL FIELD

The present invention relates to a method for controlling an internal combustion engine, an internal combustion engine, and a vehicle equipped with the same which reduce rolling vibrations due to torque fluctuations.

BACKGROUND ART

An internal combustion engine including a piston crank mechanism (hereinafter, referred to as the engine) is subjected to a force and a moment that excite translational and rotational vibrations of a power plant formed of the engine and a transmission (hereinafter, referred to as the exciting force and the exciting moment), due to the inertia forces of a reciprocating mass such as the piston and a rotating mass such as the crankshaft, and also the gas pressure inside the cylinder (hereinafter, referred to as the cylinder internal pressure).

Here, of the frequency components of each of the exciting force and the exciting moment generated, the dominant component is determined by the cylinder arrangement of the engine. For example, in the case of inline four, the 2nd-order component of the engine revolution is the dominant component. This is because the crankshaft has pairs of crankpins located opposite to each other by 180 degrees in the case of inline four. A combustion stroke occurs twice while the crankshaft rotates once. Thus, combustion strokes occur at an interval of 180 degrees in terms of crank angle, and thus the dominant component of the rolling exciting moment is the 2nd-order component of the engine revolution which fluctuates twice per revolution. This is because when the exciting moments generated at all the cylinders are shifted by 180 degrees and combined, components with fluctuation cycles, integral multiples of which are 180 degrees, intensify each other and remain, whereas the other components (with cycles, ½ and ¼ of which are 180 degrees) cancel each other out. The 4th-, 6th-, . . . order components remain, but the 2nd-order component is the greatest. As another example, in the case of inline six, the 3rd-order component of the engine revolution is the dominant component due to the same reason. When a vehicle is equipped with a power plant as described above, anti-vibration support using rubber mounts or the like is employed in a vibration transmissive system for the purpose of improving vibration problems resulting from transmission of the power plant's vibrations derived to the vehicle.

As an apparatus for reducing vibrations due to the cylinder internal pressure of each cylinder, there is an apparatus which smoothens fluctuations in the rotational speed of each cylinder by detecting the fluctuations in the rotational speed of each cylinder in each expansion stroke and comparing it with the average value of all the rotational speed fluctuations (see Patent Document 1, for example). Moreover, there is an apparatus which controls the fuel injection amount of each cylinder based on a sound or vibration generated by combustion in the cylinder (see Patent Document 2, for example). However, while these apparatuses can reduce the above-mentioned components with the cycles, ½ and ¼ of which are 180 degrees, in inline four-cylinder engines by making even the torque generated by each cylinder, they cannot reduce the 2nd-order component. Moreover, the apparatuses require complicated control because the former apparatus controls the injection amount based on the fluctuations in rotational speed in each expansion stroke, and the latter apparatus controls the injection amount based on the sound or vibration of the cylinder.

Here, assuming a vibratory system in which a power plant is a mass and rubber mounts are springs and dampers, this vibratory system undergoes a resonance phenomenon (hereinafter, referred to as the mount resonance). FIG. 7 shows the relation between the ratio of a frequency $\omega$ of the exciting force or exciting moment to a mount resonance frequency $\omega_0$, and vibration transmissibility T from the engine side to the vehicle side. For anti-vibration support of a vehicular power plant, the mount resonance frequency $\omega_0$ is set such that the vibration transmissibility T falls within a region below 1 (hereinafter, anti-vibration region) in the case where the dominant component of a normal-operation rotational speed of the engine (an idling rotational speed or higher) is the frequency $\omega$. Here, an anti-vibration region A0 is present in a range where $\omega/\omega_0$ is above 1. Thus, in start and stop processes of the engine, a state of $\omega/\omega_0=1$ (hereinafter, the resonance point RP1) is passed. As a result, the mount resonance causes a prominent vibrating phenomenon.

This vibrating phenomenon occurs in a power plant 1X including an engine 2x, a clutch housing 3, and a transmission 4 as shown in FIG. 8 and mounted on a vehicle with these apparatuses supported in such a way as to isolate vibrations by using rubber mounts 6. As shown in the figure, roll vibrations that shake the power plant 1X about the longitudinal axis of the engine 2X occur.

In a start process of an engine equipped with a start assist apparatus such as a starter motor, first, a torque is provided from the starter motor to perform intake and compression strokes. When the inside of a cylinder reaches an intake air state where combustion is possible, the combustion begins. Thereafter, the rotational speed is increased by using the torque generated by the engine itself through combustion therein and reaches a normal-operation rotational speed. The influence of the inertia force of the exciting moment generated in this process is small since the engine rotational speed is low, and the influence of the cylinder internal pressures is dominant. Here, in the above-mentioned mount resonance, the occurrence of roll vibrations excited by exciting moments due to the cylinder internal pressures is problematic in the case of a power plant in which roll resonance that shakes the power plant about the longitudinal axis of its engine is prominent.

FIG. 9 shows changes in the cylinder internal pressure of each cylinder in a start process of this engine. This figure shows the cylinder internal pressures of cylinders C1 to C4 when an inline four-cylinder engine is started. The order of ignition in this engine is the cylinder C2, the cylinder C1, the cylinder C3, and the cylinder C4. A region in which a torque is provided from the starter motor is a starter assist region A2, a region in which the rotational speed is increased by using the torque generated by the engine itself is a rotational-speed increasing region A3, and a region in which the engine rotational speed reaches a normal-operation rotational speed is a normal-operation-rotational-speed region A4. As also shown by the cylinder internal pressures, the rotational-speed increasing region A3 between 0.4 second to 0.9 second is within a process of increasing the engine rotational speed, and the cylinder internal pressures are high. The cylinder internal pressures then enter the normal-operation-rotational-speed region A4 and become substantially even. During the state where the cylinder internal pressures are high, there is a time point (a dotted line in the figure) t1 at which the above-mentioned resonance point RP1 is passed. The roll vibrations of the power plant occur due to the exciting moment resulting from the cylinder internal pressure of the cylinder C4 after the resonance point t1 that shows a high cylinder internal pressure.

Moreover, in the case where the operation has already reached the process of increasing the rotational speed by using the torque generated by the engine itself when the resonance point is passed, the exciting moment become large due to the increase in each cylinder internal pressure, thereby increasing the roll vibrations. On the other hand, it is desired to increase the cylinder internal pressures in view of improving startability such as successful start and a shorter start time. Thus, satisfying both startability and vibrations is a problem.

PRIOR ART DOCUMENT

Patent Document 1: Japanese patent application Kokai publication No. 2001-355500
Patent Document 2: Japanese patent application Kokai publication No. 2008-184915

SUMMARY OF THE INVENTION

The present invention has been made in view of the above problems, and an object thereof is to provide a method for controlling an internal combustion engine, an internal combustion engine, and a vehicle equipped with the same which are capable of reducing vibrations of a power plant during start of the engine without impairing its startability by avoiding a resonance frequency by temporarily changing the 2nd-order component of piston revolutions, which is the dominant component of a rolling exciting moment, when a resonance point is passed while the average torque is maintained at an equivalent level.

A method for controlling an internal combustion engine for achieving the above-described object includes the step of temporarily making fuel injection amounts of cylinders of a multi-cylinder internal combustion engine uneven when a rotational speed of the internal combustion engine is within a resonance-rotational-speed region around a resonance rotational speed at which resonance occurs with roll vibrations of a power plant including the internal combustion engine and a support apparatus of the power plant.

A power plant including an internal combustion engine supported in such a way as to isolate vibrations by using support apparatuses experiences a prominent vibrating phenomenon when the mount resonance frequency and the frequency of the exciting moment are at the resonance point. According to the above-described method, the fuel injection amounts of the cylinders are made temporarily uneven when the rotational speed of the internal combustion engine is within the resonance-rotational-speed region around the resonance point. In this way, the dominant component of the rolling exciting moment due to the cylinder internal pressures can be changed and prevented from coinciding with the roll resonance frequency. Accordingly, the vibrations of the internal combustion engine can be reduced.

Moreover, the above-described method for controlling an internal combustion engine includes: identifying, as depressurizing cylinders, a cylinder, a cylinder internal pressure of which becomes higher than a preset cylinder internal pressure when the rotational speed enters the resonance-rotational-speed region, and a cylinder which is the second cylinder after the cylinder in terms of an order of ignition; identifying at least one of cylinders other than the depressurizing cylinders as a pressurizing cylinder; and decreasing the fuel injection amounts of the depressurizing cylinders and increasing the fuel injection amount of the pressurizing cylinder when the rotational speed is within the resonance-rotational-speed region.

In the above-described method, the engine rotational speed is calculated with a crank angle sensor, and the cylinder performing injection is identified from the outputs of a cam angle sensor and the crank angle sensor. Meanwhile, numerical value data including the resonance, frequency, the cylinder arrangement, and the amounts by which the fuel injection amounts to be increased and decreased (correction amounts) when the resonance point is passed, is inputted to an ECU (control apparatus) in advance. Based on these pieces of information, the ECU identifies a rotational speed region in which vibrations due to roll resonance occur, and performs control that increases and decreases the fuel injection amounts of the cylinders within that region. A lower limit and an upper limit are set in the rotational speed region within which the control is to be performed. The ECU identifies, as depressurizing cylinders, a cylinder, the cylinder internal pressure of which peaks when the lower limit threshold is exceeded, and a cylinder which is the second cylinder after that cylinder in terms of the order of ignition, and identifies at least one of the cylinders other than the depressurizing cylinders as a pressurizing cylinder. Then, the ECU decreases the fuel injection amounts of the depressurizing cylinders, including the cylinder, the cylinder internal pressure of which peaks when the rotational speed is at the resonance point, i.e. when the resonant point is passed, to thereby suppress increase in the cylinder internal pressures. The ECU slightly increases the fuel injection amount of the pressurizing cylinder to maintain the average torque of the internal combustion engine. In this way, the maximum value of the exciting moment when the resonance point is passed (the resonance-point passing time) is suppressed, and the 2nd-order component of the engine revolution is distributed to other components such as the 0.5th- and 1st-order components. Accordingly, the exciting moment is reduced temporarily.

According to this method, the dominant component of the rolling exciting moment can be changed by decreasing the fuel injection amount of the cylinder, the cylinder internal pressure of which peaks when the resonance point is passed, and thereby suppressing increase in the cylinder internal pressure. In addition, in order to prevent the rotational-speed increase rate from dropping due to the decrease in the torque of the cylinder, the increase in the cylinder internal pressure of which is suppressed, the fuel injection amount of the other cylinder is increased. In this way, the average torque in a start process can be equivalent to that when the amounts of injection into the cylinders are even.

An internal combustion engine for achieving the above-described object is a multi-cylinder internal combustion engine including fuel injection apparatuses capable of adjusting fuel injection amounts of cylinders and a control apparatus, the control apparatus including: a device for determining whether or not a rotational speed of the internal combustion engine is within a resonance-rotational-speed region around a resonance rotational speed at which resonance occurs between the rotational speed and roll vibrations of a power plant including the internal combustion engine and a support apparatus of the power plant; and a device for controlling the fuel injection apparatuses such that the fuel injection amounts of the cylinders become uneven when the rotational speed is within the resonance-rotational-speed region.

Here, the device for determining whether or not the rotational speed of the internal combustion engine is within the resonance-rotational-speed region determines the resonance-rotational-speed region from the information on the resonance frequency inputted in the control apparatus in advance, and determines whether or not the rotational speed of the internal combustion engine is within that resonance-rotational-speed region. According to this configuration, operations and effects similar to those described above can be achieved.

Moreover, in the above-described internal combustion engine, the control apparatus further includes: a device for identifying, as depressurizing cylinders, a cylinder, a cylinder internal pressure of which becomes higher than a preset cylinder internal pressure when the rotational speed enters the resonance-rotational-speed region, and a cylinder which is the second cylinder after the cylinder in terms of an order of ignition, and identifying at least one of cylinders other than the depressurizing cylinders as a pressurizing cylinder; and a device for controlling the fuel injection apparatuses of the depressurizing cylinders such that the fuel injection amounts thereof are capable of being reduced and controlling the fuel injection apparatuses of the pressurizing cylinder such that the fuel injection amount thereof is capable of being increased when the rotational speed is within the resonance-rotational-speed region.

Here, once identifying the cylinder performing injection based on the outputs of the cam angle sensor and the cam angle sensor, the control apparatus identifies the cylinder, the cylinder internal pressure of which peaks within the resonance-rotational-speed region (depressurizing cylinder), and the cylinder before or after that cylinder (pressurizing cylinder) by taking into consideration the cylinder arrangement inputted in the ECU in advance. Then, the control apparatus controls the fuel injection apparatuses such that fuel is injected to these cylinders by predetermined fuel injection amounts. According to this configuration, it is possible to temporarily change a given-order component of the engine revolution, which is the dominant component of the rolling exciting moment, when the resonance point is passed during start of the engine while the average torque is maintained to an equivalent level. Accordingly, it is possible to avoid the resonance frequency and to reduce the vibrations of the power plant without impairing its startability.

Further, a vehicle for achieving the above-described object is equipped with any one of the above-described internal combustion engines. This internal combustion engine is applicable to petrol engines and diesel engines to be mounted on vehicles. Moreover, besides vehicles, the internal combustion engine is applicable to the internal combustion engines of generators and the like in which vibrations during start are considered as a problem.

According to the present invention, it is possible to reduce vibrations of a power plant during start of its engine without impairing the startability by avoiding a resonance frequency by temporarily changing the 2nd-order component of piston revolutions, which is the dominant component of a rolling exciting moment, when a resonance point is passed while the average torque is maintained at an equivalent level.

DESCRIPTION OF THE EMBODIMENTS

Hereinbelow, a method for controlling an internal combustion engine, an internal combustion engine, and a vehicle equipped with the same of an embodiment according to the present invention will be described with reference to the drawings by taking an inline four-cylinder engine as an example.

Figure 1:
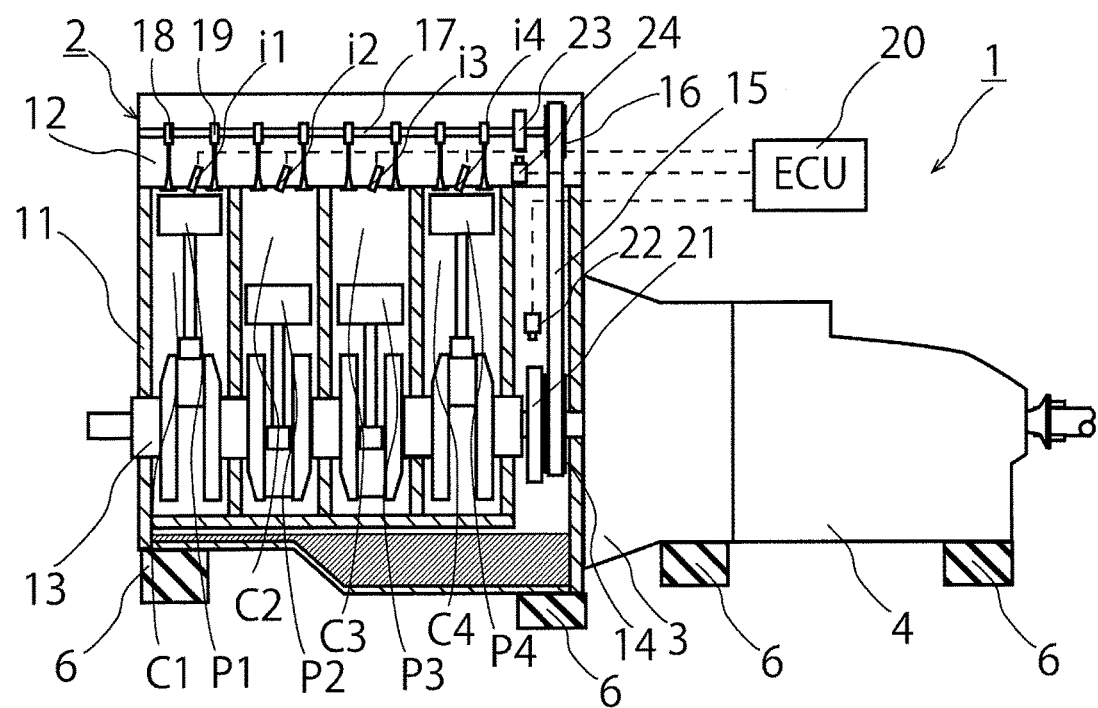
FIG. 1 is a side view showing a power plant including an internal combustion engine of an embodiment according to the present invention.

As shown in FIG. 1, a power plant 1 includes an engine 2, a clutch housing 3, and a transmission 4, and rubber mounts 6, and the rubber mounts 6 support this power plant 1 on a vehicle while isolating vibrations. The engine 2, the clutch housing 3, and the transmission 4 constituting the power plant 1 are those that are generally used. For example, a diesel engine or a petrol engine can be used as the engine 2. As for the arrangement and the number of cylinders, the engine 2 is not limited to inline four but may be inline six or V6. Moreover, the supporting points and the number of the rubber mounts 6 can be set to any points and number as long as they can support the power plant 1 on a vehicle. Furthermore, an active hydraulic mount apparatus or the like can be used.

The engine 2 includes a cylinder block 11, a cylinder head 12, a crankshaft 13, a crankshaft timing gear 14, a timing chain 15, a camshaft timing gear 16, a camshaft 17, intake valves 18, and exhaust valves 19. The engine 2 also includes cylinders C1 to C4, pistons P1 to P4, and injectors i1 to i4. The engine 2 is an inline four-cylinder diesel engine and performs the general four-stroke operations of an intake stroke, a compression stroke, a power stroke, and an exhaust stroke.

In addition, the engine 2 also includes a crankshaft pulser rotor 21, a crank angle sensor 22, a camshaft pulser rotor 23, and a cam angle sensor 24. Further, the engine 2 also includes an ECU (engine control unit) 20 which is a control apparatus connected to the injectors i1 to i4, the crank angle sensor 22, and the cam angle sensor 24 by signal lines.

Figure 2:
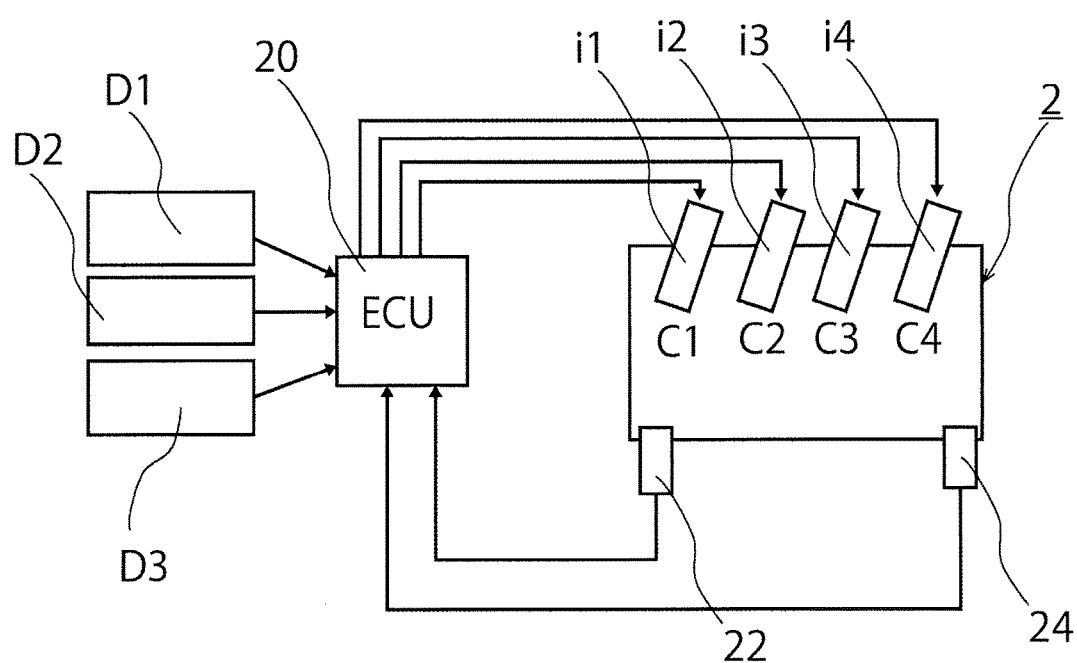
FIG. 2 is a block diagram of the internal combustion engine of the embodiment according to the present invention.

Next, the configuration of a control system of the internal combustion engine of the embodiment according to the present invention will be described as shown in FIG. 2. The ECU 20 receives the sensor outputs of the crank angle sensor 22, the cam angle sensor 24, and the like through their signal lines. Moreover, resonance frequency information D1, cylinder arrangement information D2, and fuel-injection-amount correction information D3 are inputted to the ECU 20 in advance, and the ECU 20 controls the amounts of fuel to be injected by the injectors i1 to i4 based on these pieces of information.

The ECU 20 is a microcontroller which controls the engine with electrical circuits and performs collective electrical control on the ignition timings (in the case of a petrol engine), the fuel injection timings, the fuel injection amounts, and the like. In the case of an automatic transmission vehicle, the ECU 20 controls the whole power plant as well. The ECU 20 has optimal control values stored therein for various driving states, and controls each mechanism by detecting the current state with the sensors and selecting the optimal value from the stored data according to input signals from the sensors.

The crank angle sensor 22 is a sensor which is formed of an MR element (magnetoresistive element) and detects the angle of the crankshaft 13. The crank angle sensor 22 is attached facing a protrusion attached to the crankshaft pulser rotor provided on the crankshaft 13, and detects a rotational speed signal of the engine 2 and cycle signals of the cylinders C1 to C4.

The cam angle sensor 24 is a sensor which is formed of an MR element or the like and detects the angle of the camshaft 17. The cam angle sensor 24 is attached facing a protrusion attached to the camshaft pulser rotor 23 provided on the camshaft 17, and detects top-dead-center (TDC) signals and cylinder identifying signals.

With the input signals from the crank angle sensor 22 and the cam angle sensor 24, the ECU 20 can figure out the rotational speed of the engine 2 and perform cylinder identification for identifying the compression stroke or the exhaust stroke of each of the cylinders C1 to C4, and calculates the ignition timings, the fuel injection timings, and the fuel injection amounts. Thus, the crank angle sensor 22 and the cam angle sensor 24 are not limited to the above-described configurations as long as they enable the ECU 20 to calculate the ignition timings, the fuel injection timings, and the fuel injection amounts.

The injectors i1 to i4 are apparatuses which are connected to a common rail (in the case of a diesel engine; not shown) and inject fuel directly toward the tops of the pistons P1 to P4, respectively. High pressure fuel stored in the common rail is constantly supplied to the injectors i1 to i4. A high-pressure supply pump (not shown) pumps fuel to the common rail. A nozzle at the tip of each of the injectors i1 to i4 is formed in a conical shape with multiple small injection holes, and fuel is injected radially from the multiple small injection holes all at once. The injectors i1 to i4 are not limited to the above configuration as long as they can inject fuel toward the tops of their pistons P1 to P4.

The resonance frequency information D1 will be described. In the case where the engine 2 is, for example, an inline four-cylinder engine, a combustion stroke occurs twice among the cylinders C1 to C4 while the crankshaft 13 rotates once. Thus, the combustion strokes occur at an interval of 180 degrees in terms of crank angle. The dominant component of the rolling exciting moment of the power plant 1 is the 2nd-order component of the engine revolution which fluctuates twice per revolution. This is because when the exciting moments generated at the cylinders C1 to C4 are shifted by 180 degrees and combined, components with fluctuation cycles, integral multiples of which are 180 degrees, intensify each other and remain, whereas the other components (with cycles, ½ and ¼ of which are 180 degrees) cancel each other out. Thus, the dominant component of the rolling exciting moment is the 2nd-order component of the revolution of the engine 2, and a rotational speed R0 of the engine 2 at which this component coincides with a resonance point RP1=12 Hz is calculated from the following formula 1.

$$R0 = 12 \times 60 \div 2 = 360 \text{ [rpm]} \quad \text{[Formula 1]}$$

Figure 3:
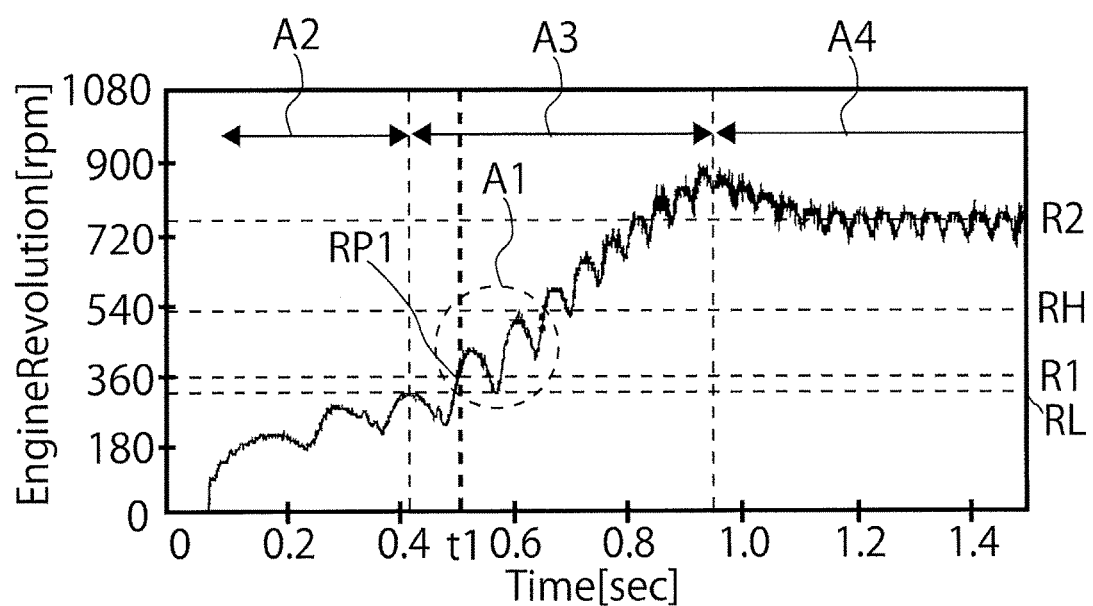
FIG. 3 is a diagram showing a resonance point between the rotational speed of the internal combustion engine of the embodiment according to the present invention and roll vibrations.

Now, see FIG. 3 showing the relation between the rotational speed of the engine 2 and start time, i.e. the rotational speed of the engine 2 during a start process. The resonance point is a resonant point RP1, the point at which the resonance appears is a resonance occurring time t1, and a rotational speed R1=360 rpm at which the resonance point appears is a resonance-occurring rotational speed R1. A region around the resonance-occurring rotational speed R1 is a resonance-rotational-speed region A1. The roll vibrations of the power plant 1 become prominent in this resonance-rotational-speed region A1. Thus, the resonance frequency information D1 is this resonance point RP1 and the resonance rotational speed R1, from which the resonance occurring time t1 and the resonance-rotational-speed region A1 are calculated.

Upper and lower thresholds, i.e. a lower-limit rotational speed RL and an upper-limit rotational speed RH are set in the range of the resonance-rotational-speed region A1. Preferably, the lower-limit rotational speed RL is a value of −0 rpm to −100 rpm from the resonance rotational speed R1, and the upper-limit rotational speed RH is a value of +0 rpm to +300 rpm from the resonance rotational speed R1. More preferably, the lower-limit rotational speed RL is a value of −20 rpm to −40 rpm from the resonance rotational speed R0, and the upper-limit rotational speed RH is a value of +80 rpm to +140 rpm from the resonance rotational speed R0.

The resonance point RP1, the resonance occurring time t1, the resonance rotational speed R1, and the resonance-rotational-speed region A1 described above take values that vary depending upon the type of the engine 2. Thus, the above numeral values are mere examples and their ranges are not limited to the above values.

The cylinder arrangement information D2 is data on the order of arrangement of the cylinders C1 to C4 and the order of their ignition. The order of ignition in the engine 2 is the cylinder C1, the cylinder C3, the cylinder C4, and the cylinder C2.

Figure 9:
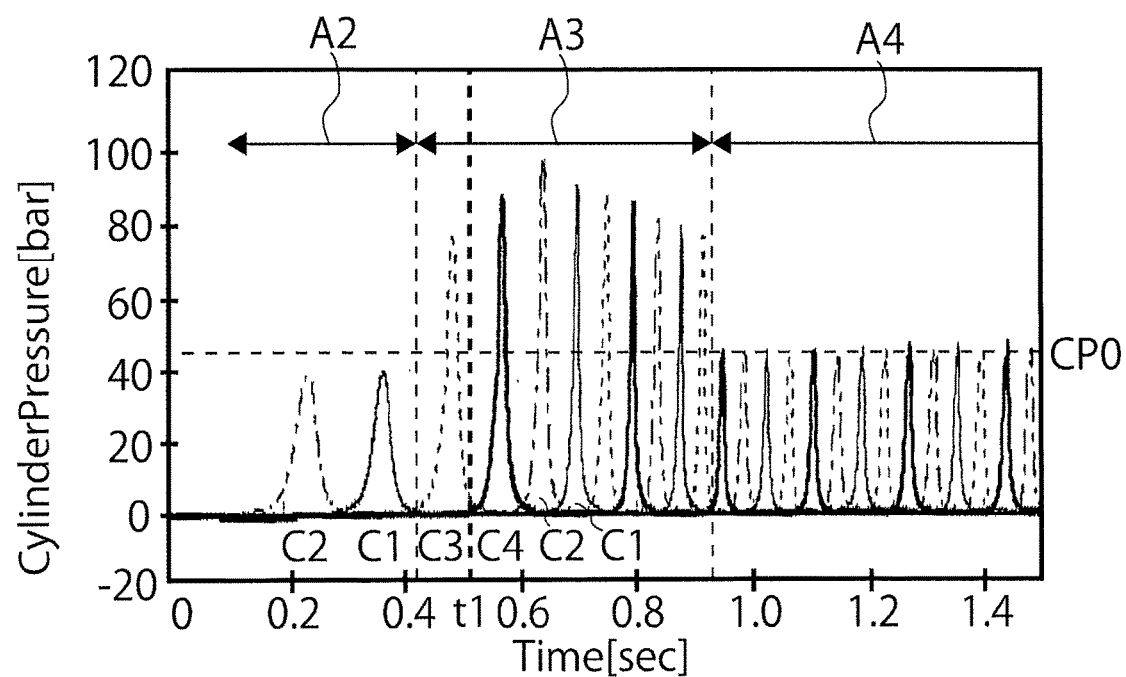
FIG. 9 is a diagram showing the cylinder internal pressure of each cylinder in the conventional internal combustion engine.

The fuel-injection-amount correction information D3 is a set of preset correction amounts for fuel to be injected from the injectors i1 to i4. These correction amounts are fuel injection amounts to be controlled by the ECU 20 so that the cylinder internal pressures shown in FIG. 4 can be obtained. Here, the cylinder internal pressures of the cylinders C1 to C4 are CP1 to CP4, respectively. The amount of fuel to be injected into the cylinder C4 is reduced to adjust the cylinder internal pressure CP4 to substantially the same level as a cylinder internal pressure CP0 used during operation at a normal-operation rotational speed R2, and the cylinder internal pressure CP1 is adjusted to be as close as possible to the cylinder internal pressure CP0. As compared to FIG. 9 showing the cylinder internal pressures in the conventional case mentioned earlier, a decrease is observed in the cylinder internal pressure CP4 of the cylinder C4 which was the first peaking cylinder internal pressure after the resonance occurring time t1, and also in the cylinder internal pressure CP1 of the cylinder C1 which is the second cylinder after the cylinder C4 in terms of the order of ignition. Thus, fuel-injection correction amounts allowing the cylinder internal pressures to be as shown in FIG. 4 are inputted in the fuel-injection-amount correction information D3.

Figure 4:
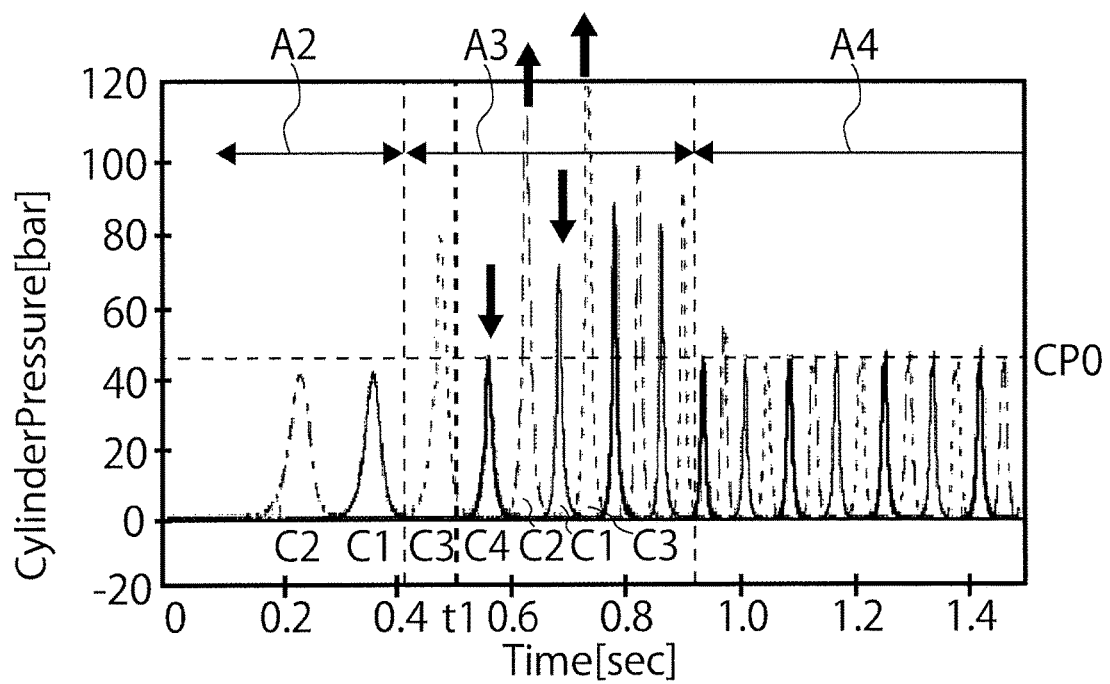
FIG. 4 is a diagram showing the cylinder internal pressure of each cylinder in the internal combustion engine of the embodiment according to the present invention.

Moreover, as compared to FIG. 9, an increase is observed in the cylinder internal pressure CP2 and the cylinder internal pressure CP3 of the cylinder C2 and the cylinder C3 other than the cylinders C4 and C1 as shown in FIG. 4. Specifically, the fuel injection amounts of the cylinders C2 and C3 are increased to compensate the amount of the torque of the engine 2 decreased by the cylinder internal pressure CP4 and the cylinder internal pressure CP1 mentioned above, thereby preventing the torque from falling below the average torque under normal conditions. Thus, fuel-injection correction amounts allowing the engine 2 to maintain this average torque are inputted in the fuel-injection-amount correction information D3 as well.

According to the above-described configuration, the resonance-rotational-speed region A1 within which vibrations due to roll resonance of the power plant 1 occurs is identified based on the crank angle sensor 22, the cam angle sensor 24, the resonance frequency information D1, the cylinder arrangement information D2, and the fuel-injection-amount correction information D3, and when the rotational speed is within the resonance-rotational-speed region A1, the fuel injection amounts of the cylinders C1 to C4 are increased and decreased so that the fuel injection amounts can be temporarily uneven. As a result, the dominant component of the rolling exciting moment due to the cylinder internal pressures is changed and prevented from coinciding with the roll resonance frequency. Accordingly, the vibrations of the engine 2 can be reduced.

Figure 5:
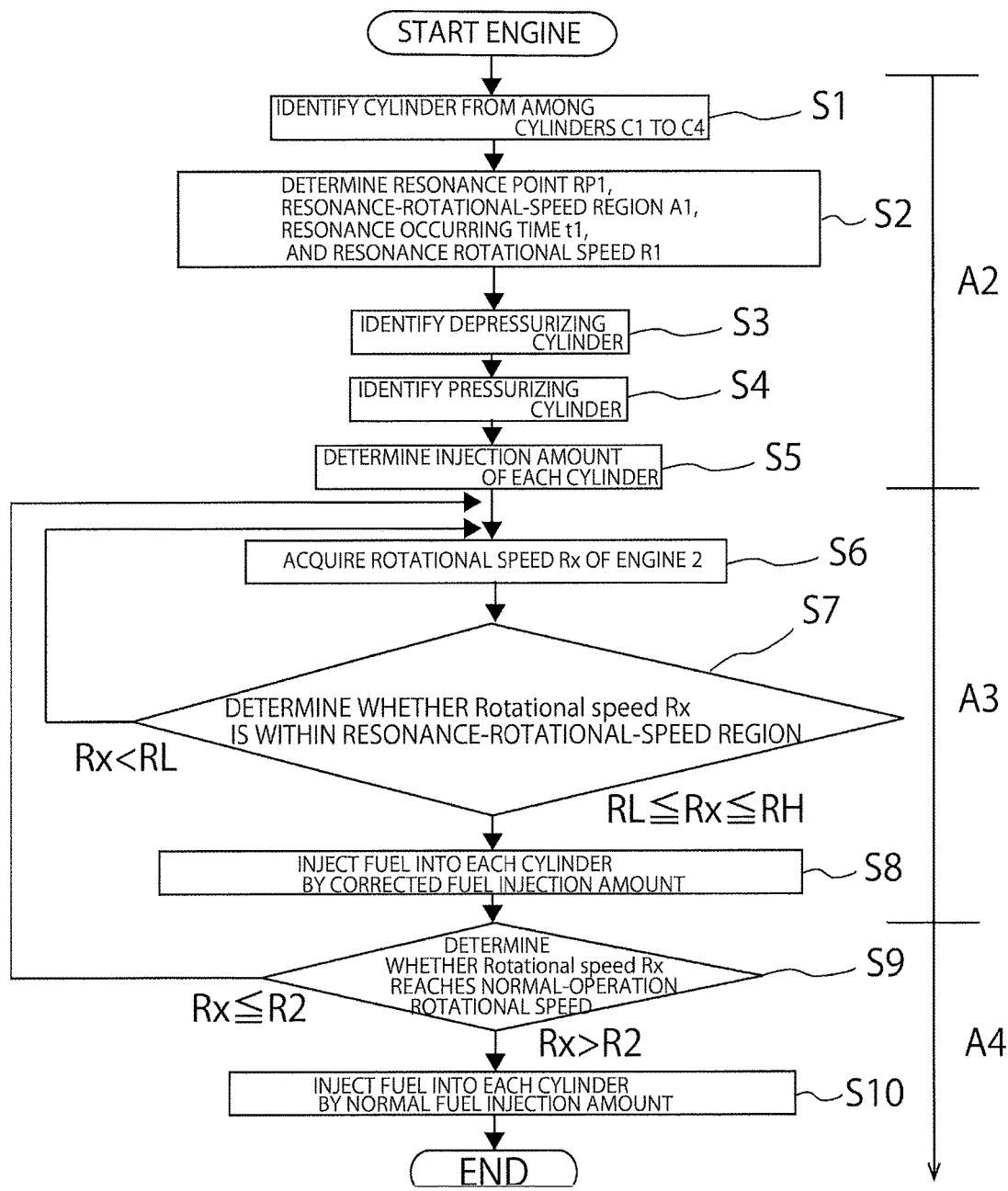
FIG. 5 is a flowchart showing a method for controlling the internal combustion engine of the embodiment according to the present invention.

Next, a controlling method of the embodiment of the present invention (operation of the engine 2) will be described as shown in FIG. 5. Here, the rotational speed of the engine 2 is Rx.

When the engine 2 is started, a starter (not shown) rotates the crankshaft 13, so that the pistons P1 to P4 start moving vertically inside their cylinders C1 and C4. Once the engine 2 is started and the four-stroke operations begin, the crank angle sensor 22 then detects the rotational angle of the crankshaft 13, and the ECU 20 receives that signal. At the same time, the cam angle sensor 22 detects the phase angle of the camshaft 17, and the ECU 20 receives that signal. The ECU 20 performs step S1 of calculating the position of the camshaft 17 from the difference from a reference angle of the camshaft 17, and identifying which cylinder is performing injection from the difference and the signal detected by the crank angle sensor 22.

Then, the ECU 20 performs step S2 of determining the resonance occurring time t1, which is when the resonance point RP1 appears, and the resonance-rotational-speed region A1 from the resonance frequency information D1 (the resonance point RP1 and the resonance rotational speed R1), the resonance point RP1 being a point where resonance occurs with the roll resonance frequency at which roll vibrations of the power plant 1 occur. The resonance-rotational-speed region A1 is calculated as a range between the lower-limit rotational speed RL and the upper-limit rotational speed RH determined from the resonance rotational speed R1. In the case where the resonance rotational speed R1 is 360 rpm, the lower-limit rotational speed RL and the upper-limit rotational speed RH are set to be 330 rpm and 460 rpm, respectively.

Then, the ECU 20 performs step S3 of identifying depressurizing cylinders. The ECU 20 predicts the situations the cylinders C1 to C4 are to be in when the rotational speed Rx exceeds the lower-limit rotational speed RL, based on the cylinder identification in step S1, the cylinder arrangement information D2, and the resonance-rotational-speed region A1 in step S2. As shown in FIGS. 3 and 4, the cylinder C3 is predicted to perform an expansion stroke when the rotational speed Rx exceeds the value of the lower-limit rotational speed RL. Then, the cylinder C4 which enters a compression stroke and thereby increases its cylinder internal pressure CP4 is determined as a depressurizing cylinder. Moreover, the cylinder C1 which is the second cylinder after the cylinder C4 in terms of the order of ignition is also determined as a depressurizing cylinder. Now, the identification for the depressurizing cylinder C4 and the depressurizing cylinder C1 is done.

As shown in FIG. 5, once determining the depressurizing cylinders C4 and C1, the ECU 20 then proceeds to step S4 of determining the cylinders other than the depressurizing cylinders C4 and C1, i.e. the cylinder C3 and the cylinder C2 as pressurizing cylinders. By steps S3 and S4, the depressurizing cylinders C4 and C1 and the pressurizing cylinders C2 and C3 are identified, and the ECU 20 proceeds to the next step.

Then, the ECU 20 performs step S5 of determining the fuel injection amounts of the depressurizing cylinders C4 and C1 and the pressurizing cylinders C2 and C3. Here, based on the fuel-injection-amount correction information D3, the ECU 20 determines by how much the fuel injection amounts of the depressurizing cylinders C4 and C1 are to be reduced, and by how much the fuel injection amounts of the pressurizing cylinders C2 and C3 are to be increased. As mentioned earlier, the fuel injection amount of the depressurizing cylinder C4 is set to a fuel injection amount corrected such that the cylinder internal pressure CP4 after combustion is substantially the same as the cylinder internal pressure CP0 used during operation at the normal-operation rotational speed R2. Moreover, the fuel injection amount of the depressurizing cylinder. C1 is set to a fuel injection amount corrected such that the cylinder internal pressure CP1 is close to the cylinder internal pressure CP0 but does not excessively decrease the torque of the engine 2. Further, the fuel injection amounts of the pressurizing cylinder C2 and the pressurizing cylinder C3 are set to fuel injection amounts corrected such that the torque of the engine 2 decreased by the amount corresponding to the decrease in the cylinder internal pressures CP4 and CP1 can be maintained at the average torque obtained in the case where the depressurizing cylinders C4 and C1 are not depressurized.

The steps up to S5 are performed within a starter assist region A2 and are completed before the rotational speed Rx of the engine 2 enters a rotational-speed increasing region A3.

Then, the ECU 20 performs step S6 of acquiring the rotational speed Rx of the engine 2 from the signal detected by the crank angle sensor 22. Once acquiring the rotational speed Rx, the ECU 20 then performs step S7 of determining whether or not the rotational speed Rx is within the resonance-rotational-speed region A1. If the rotational speed Rx is not within the resonance-rotational-speed region A1, the ECU 20 returns to step S6 to acquire the rotational speed Rx again and performs this loop until the rotational speed Rx enters the resonance-rotational-speed region A1.

If determining that the rotational speed Rx is within the resonance-rotational-speed region A1, the ECU 20 performs step S8 of causing the injectors i1 to i4 to sequentially inject fuel into their cylinders C1 to C4 by the corrected fuel injection amounts determined in steps S3 to S5.

By this step S8, the maximum value of the exciting moment when the resonance point RP1 is passed (the resonance occurring time t1) is suppressed, and the 2nd-order component of the engine revolution is distributed to other components such as the 0.5th- and 1st-order components. Accordingly, the exciting moment can be reduced temporarily.

Once completing step S8, the ECU 20 then performs step S9 of determining whether or not the rotational speed Rx of the engine 2 reaches the normal-operation rotational speed R2. If there is a resonance point other than the resonance point RP1 in step S2, injection is performed in the cylinders at that resonance point by using different fuel injection amounts as in the case described above.

While the rotational speed Rx is within the rotational-speed increasing region A3, that is, until the rotational speed Rx reaches the normal-operation rotational speed R2, the cylinder internal pressures CP1 to CP4 can possibly be the dominant component of the rolling exciting moment, and the fuel injection amounts therefore need to be uneven among the cylinders C1 to C4.

When the rotational speed Rx of the engine 2 reaches the normal-operation rotational speed R2, the cylinder internal pressures CP1 to CP4 of the cylinders C1 to C4 become substantially even at the cylinder internal pressure CP0 as shown in FIG. 4. In step S9, the ECU 20 determines whether or not the rotational speed Rx reaches the normal-operation rotational speed R2 at which the cylinder internal pressures CP1 to CP4 become substantially even. If determining that the rotational speed Rx reaches the normal-operation rotational speed R2, i.e., the cylinder internal pressures CP1 to CP4 become substantially even, the ECU 20 proceeds to the next step. This step S9 is not limited to the method described above, but may use a method in which whether or not the cylinder internal pressures CP1 to CP4 of the cylinders C1 to C4 become substantially even is determined by, for example, using sensors configured to detect the cylinder internal pressures CP1 to CP4 of the cylinders C1 to C4.

If determining the rotational speed Rx reaches the normal-operation rotational speed R2, the ECU 20 performs step S10 of setting the fuel injection amounts of the cylinders C1 to C4 back to normal ones, so that the control of the engine 2 is completed.

According to the above operations (method), the dominant component of the rolling exciting moment can be changed by decreasing the fuel injection amount of the depressurizing cylinder C4, the cylinder internal pressure of which peaks when the resonance point is passed, such that the cylinder internal pressure of the depressurizing cylinder C4 becomes substantially the same as the cylinder internal pressure used during operation at the normal-operation rotational speed R2, and thereby suppressing increase in the cylinder internal pressure. Moreover, the fuel injection amount of the depressurizing cylinder C1, which is the second cylinder after the depressurizing cylinder C4 in terms of the order of ignition, is also decreased for the same reason. In addition, in order to prevent the rotational-speed increase rate from dropping due to the decrease in the torques of the depressurizing cylinders C4 and C1, the fuel injection amounts of the pressurizing cylinder C2 and the pressurizing cylinder C3 other than the depressurizing cylinders C4 and C1 are increased. In this way, the average torque in a start process can be equivalent to that when the amounts of injection into the cylinders C1 to C4 are even. As a result, the maximum value of the exciting moment when the resonance point RP1 appears (the resonance occurring time t1) is suppressed, and the 2nd-order component of the engine revolution is distributed to other components such as the 0.5th- and 1st-order components. Accordingly, the exciting moment can be reduced temporarily.

A vehicle equipped with the power plant 1 including the engine 2 which performs the above-described operations can temporarily change a given-order component of the engine revolution which is the dominant component of the rolling exciting moment, at the resonance occurring time t1 during start of the engine 1 while the average torque is maintained to an equivalent level. Accordingly, it is possible to avoid the resonance frequency and to start the engine 2 without impairing the startability. The power plant 1 including the engine 2 is effective in cases where the engine 2 is started frequently, such as when the vehicle is equipped with an idling stop system.

Figure 6:
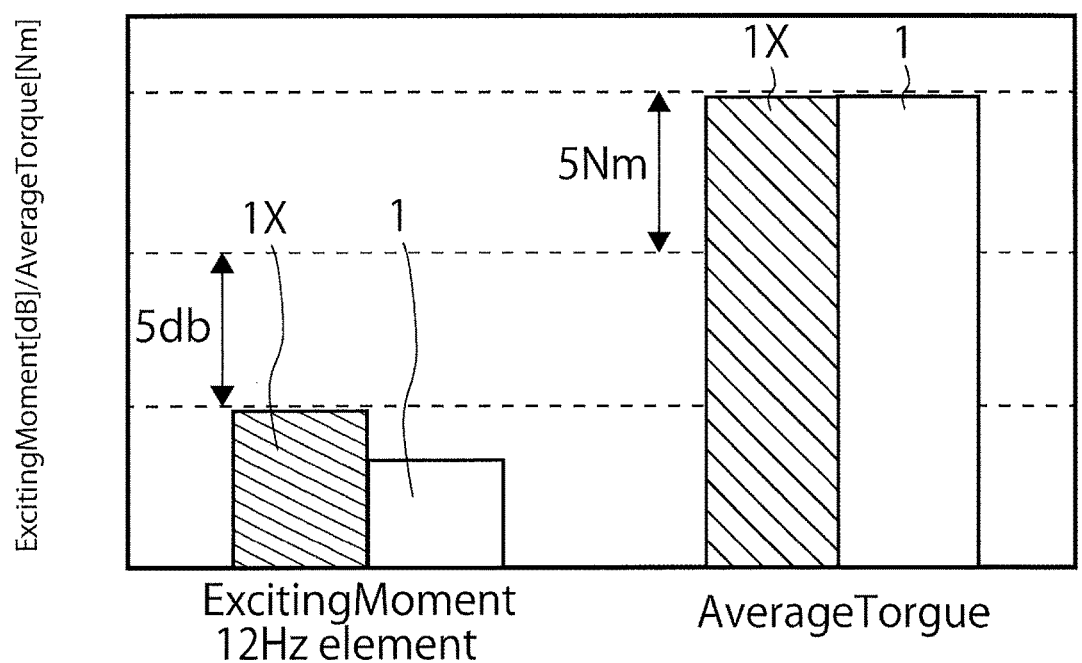
FIG. 6 is a diagram showing an exciting moment improved by the internal combustion engine of the embodiment according to the present invention.
Figure 7:
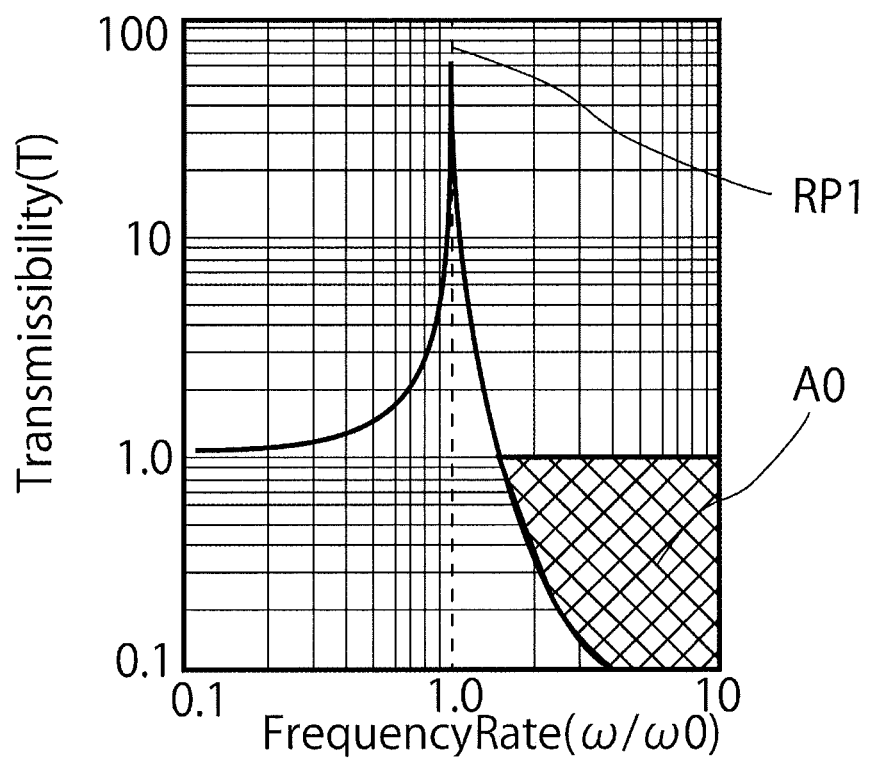
FIG. 7 is a diagram showing general description of conventional anti-vibration support.
Figure 8:
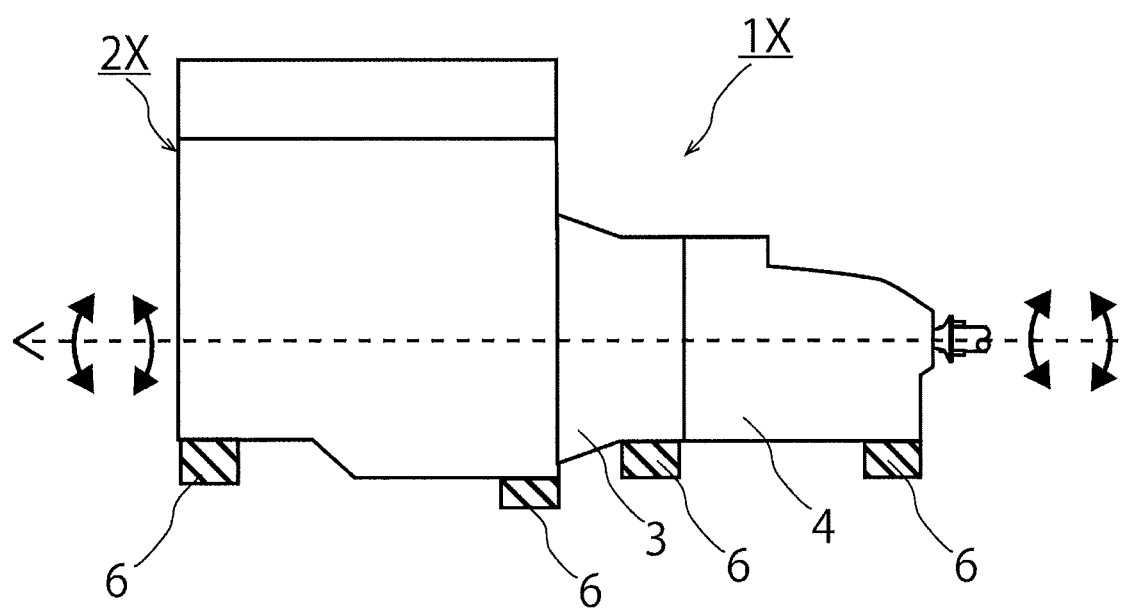
FIG. 8 is a side view showing roll vibrations of a conventional internal combustion engine.

FIG. 6 shows a graph indicating the exciting moment and the average torque of the conventional power plant 1X and those of the power plant 1 including the engine 2 of the embodiment of the present invention. The power plant 1X and the power plant 1 have substantially the same average torque. However, the power plant 1 has an exciting moment smaller by approximately 2 dB, and thus an effect of the internal combustion engine of the present invention is observed.

In the case where the above-described engine 2 includes six cylinders, too, operations and effects similar to those described above can likewise be achieved by controlling the fuel injection amount of the cylinder, the cylinder internal pressure of which peaks at the resonance occurring time t1, and the fuel injection amount of the second cylinder after that cylinder in terms of the order of ignition such that their cylinder internal pressures decrease, and by controlling the fuel injection amount of the cylinder situated between the above cylinders in terms of the order of ignition such that the cylinder internal pressure of that cylinder increases.

The above-described engine 2 is not limited to the engines of vehicles but is applicable also to the internal combustion engines of generators and the like in which vibrations during start are considered as a problem.

The method for controlling an internal combustion engine, the internal combustion engine, and the vehicle equipped with the same of the present invention are capable of reducing vibrations of the internal combustion engine during start, and can therefore be used for or as vehicles such as trucks. In addition, the method for controlling an internal combustion engine, the internal combustion engine, and the vehicle equipped with the same of the present invention are not limited to the internal combustion engines of vehicles but can be used for or as the internal combustion engines of generators and the like.

The invention claimed is:

1. A method for controlling an internal combustion engine having at least first, second and third cylinders, comprising:
identifying the first cylinder, of which first cylinder internal pressure peaks when a rotational speed of the engine enters a resonance-rotational-speed region at which resonance occurs, and the third cylinder, as depressurizing cylinders;
identifying the second cylinder, which is ignited between the identified depressurizing first and third cylinders, as a pressurizing cylinder; and
decreasing fuel injection amounts to the identified first and third cylinders and increasing a fuel injection amount to the identified second cylinder, when the rotational speed is within the resonance-rotational-speed region.

2. The method according to claim 1, wherein the identifying of the cylinders occurs when the rotational speed exceeds a lower-limit of the resonance-rotational-speed region.

3. A control apparatus for at least first, second and third cylinders of a vehicle engine, the control apparatus comprising:

an electronic controller configured to— determine whether or not a rotational speed of the engine is within a resonance-rotational-speed region at which resonance occurs;

identify the first cylinder, of which first cylinder the internal pressure peaks when the rotational speed of the engine enters the resonance-rotational-speed region, and the third cylinder as depressurizing cylinders;

identify the second cylinder, which is ignited between the first cylinder and the third cylinder, as a pressurizing cylinder; and decrease fuel injection amounts to the first and third cylinders, and increase a fuel injection amount to the second cylinder, when the rotational speed is within the resonance-rotational-speed region.

4. The control apparatus according to claim 3, wherein the cylinders are identified when the rotational speed exceeds a lower-limit of the resonance-rotational-speed region.

5. A vehicle equipped with the control apparatus according to claim 3.

6. A vehicle equipped with the control apparatus according to claim 4.

* * * * *